Feb. 28, 1956     F. P. ADLER     2,736,269
BOX CAR SIDE SILL CONSTRUCTION
Filed Sept. 14, 1950     6 Sheets-Sheet 1
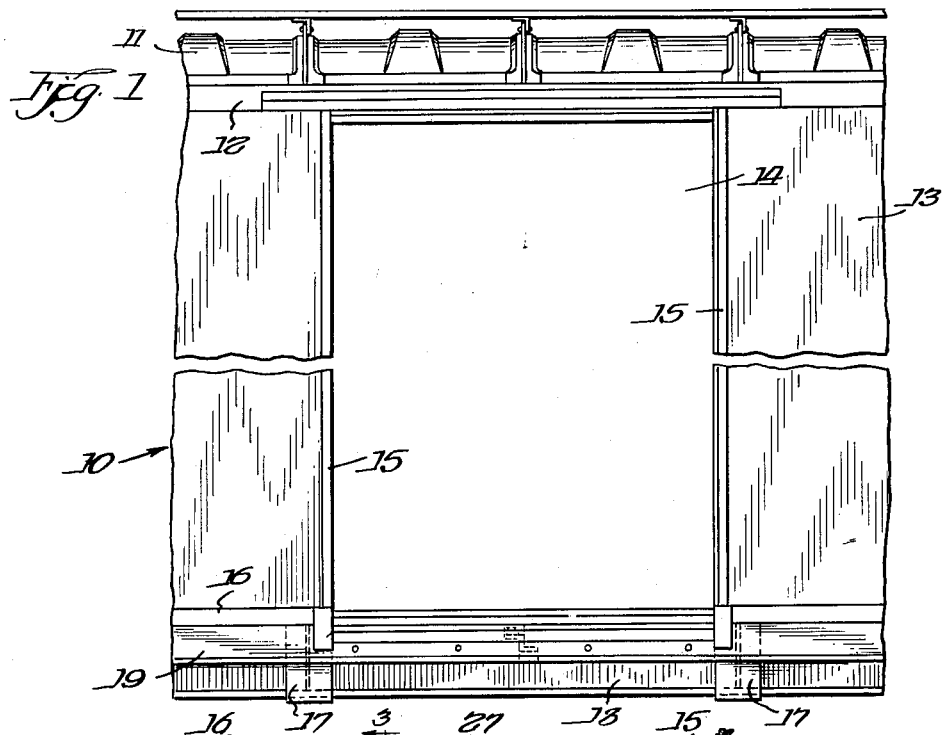
Inventor
Franklin P. Adler.
By Wayne Morris Russell
Atty.

Feb. 28, 1956 F. P. ADLER 2,736,269
BOX CAR SIDE SILL CONSTRUCTION
Filed Sept. 14, 1950 6 Sheets-Sheet 2
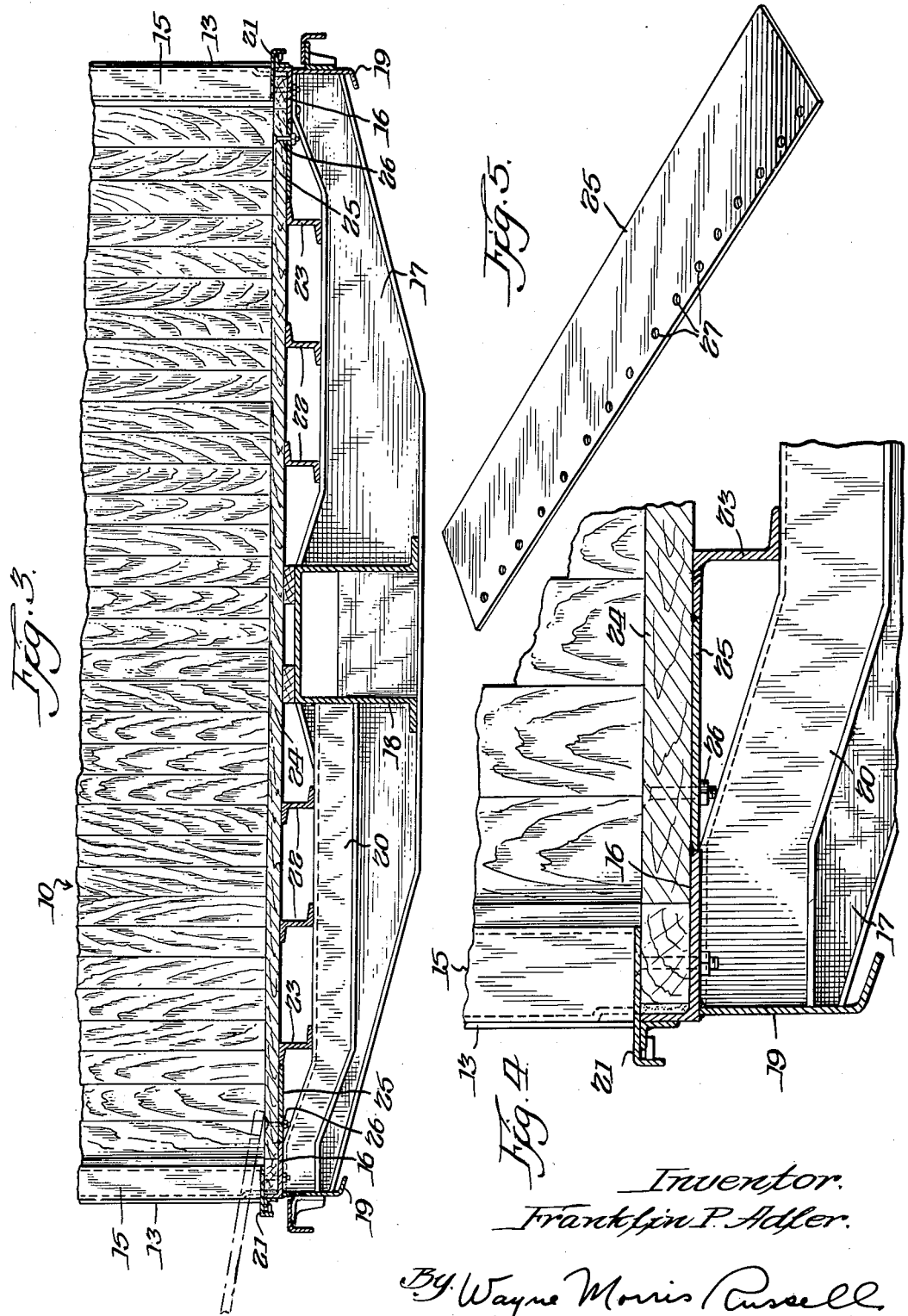
Inventor.
Franklin P. Adler.
By Wayne Morris Russell
Atty.

Feb. 28, 1956 F. P. ADLER 2,736,269
BOX CAR SIDE SILL CONSTRUCTION
Filed Sept. 14, 1950 6 Sheets-Sheet 3
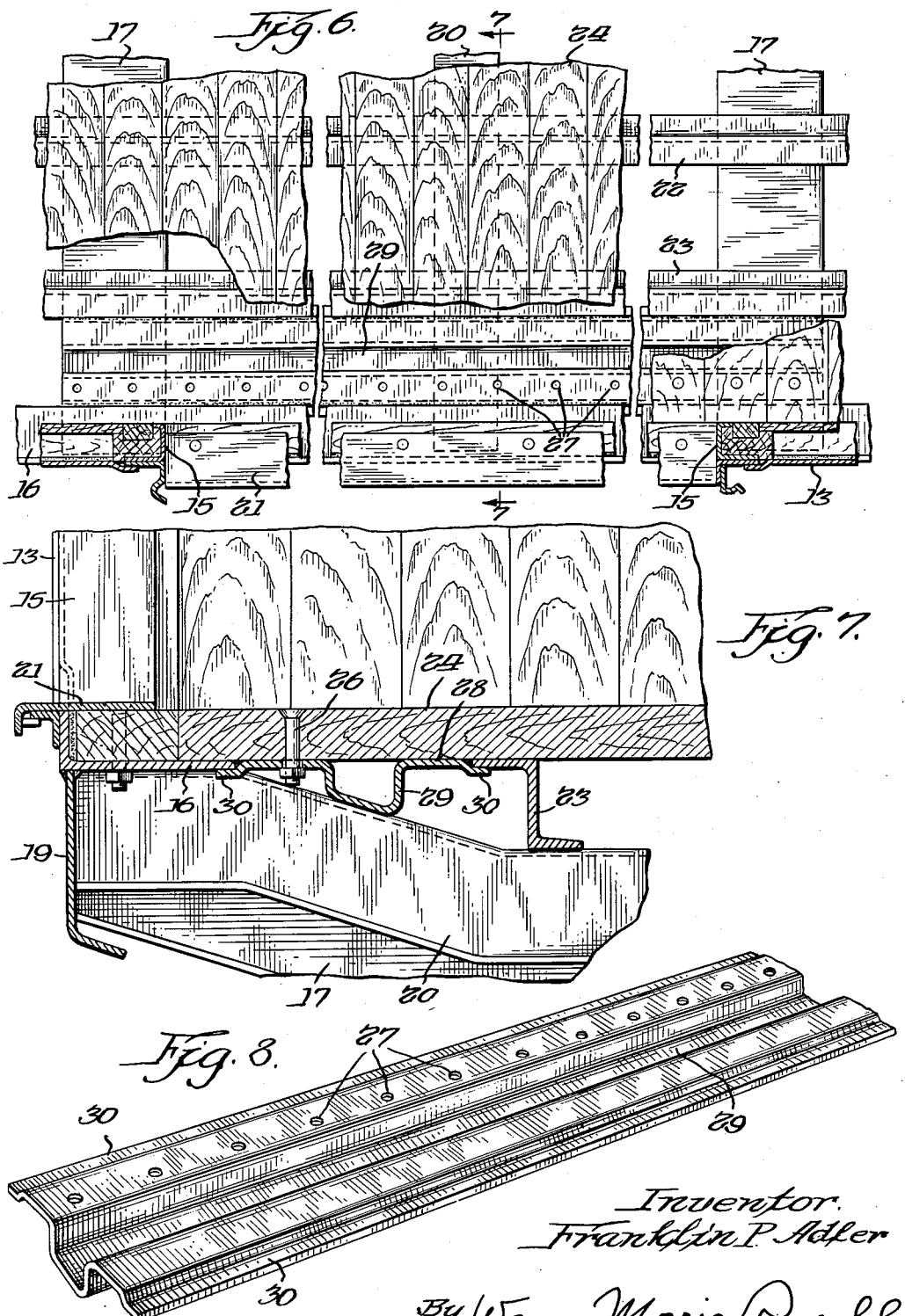

Feb. 28, 1956 F. P. ADLER 2,736,269
BOX CAR SIDE SILL CONSTRUCTION
Filed Sept. 14, 1950 6 Sheets-Sheet 4
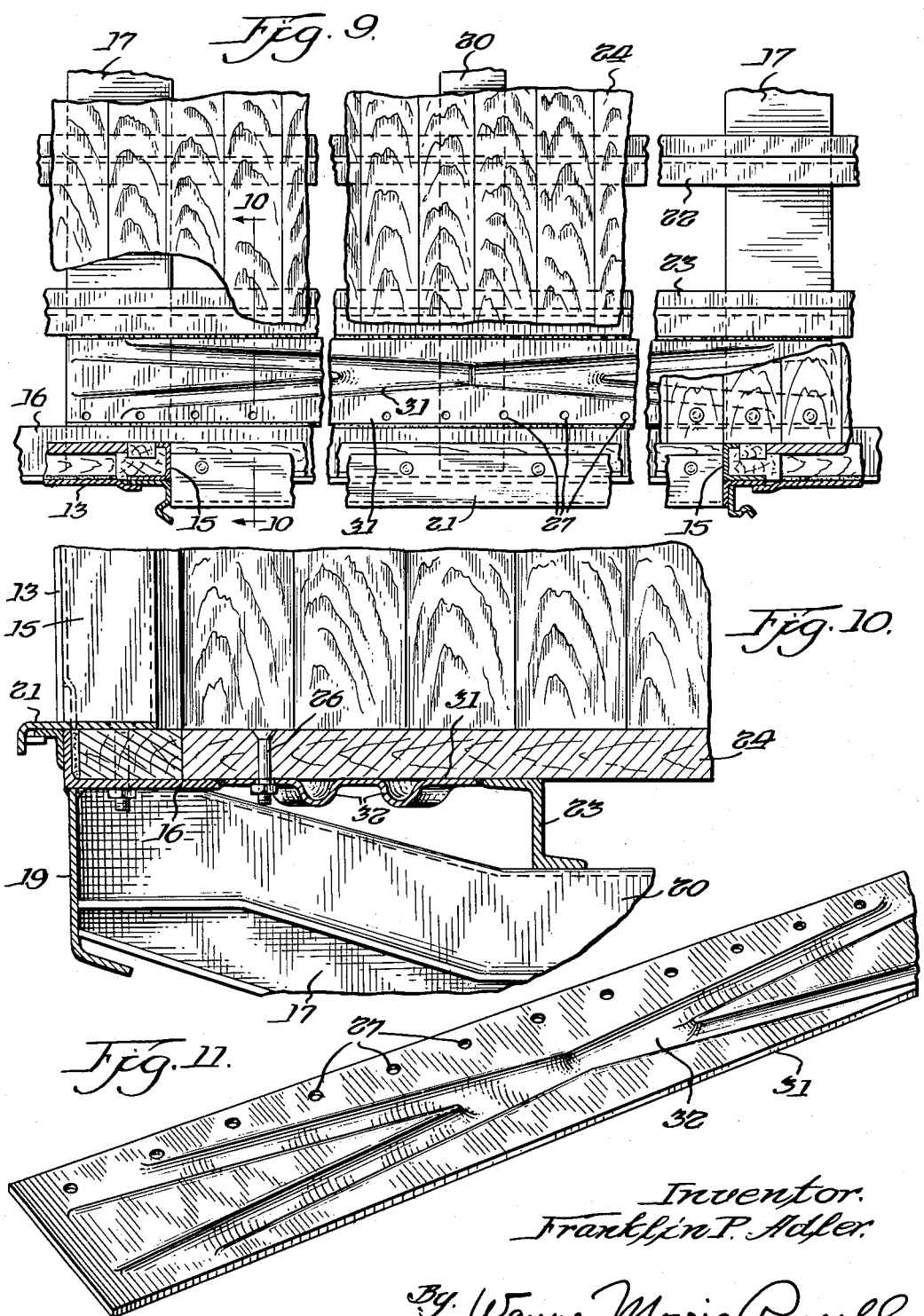

Feb. 28, 1956  F. P. ADLER  2,736,269
BOX CAR SIDE SILL CONSTRUCTION
Filed Sept. 14, 1950  6 Sheets-Sheet 5
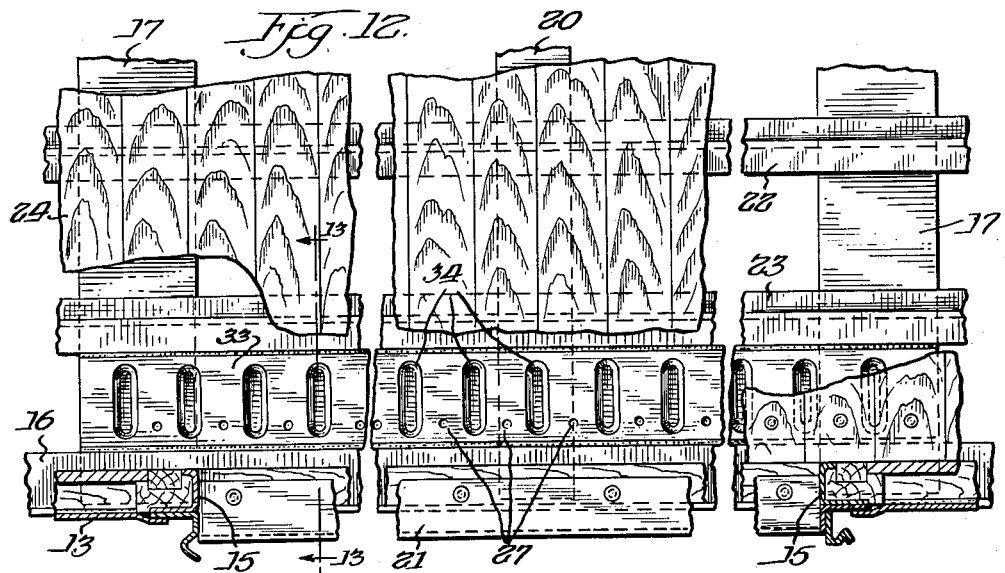
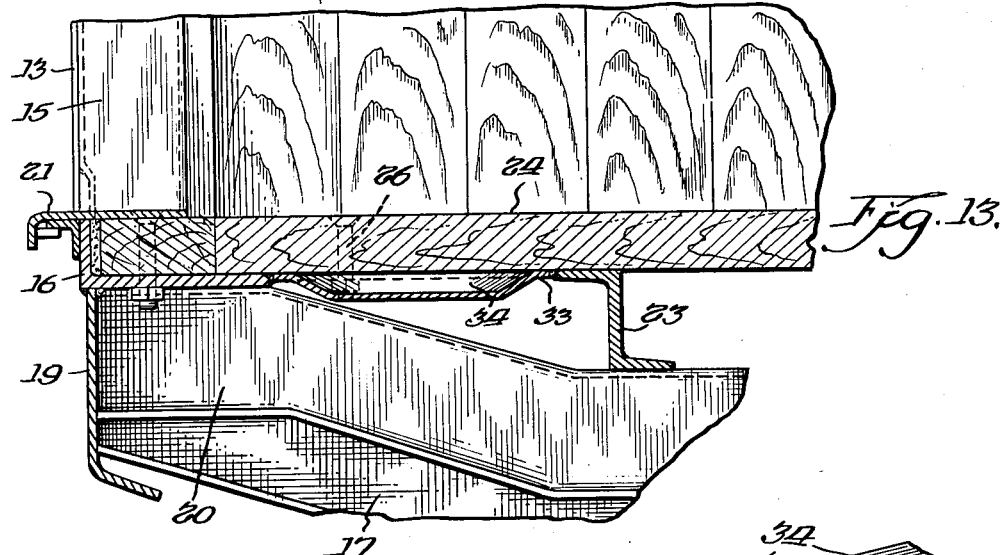
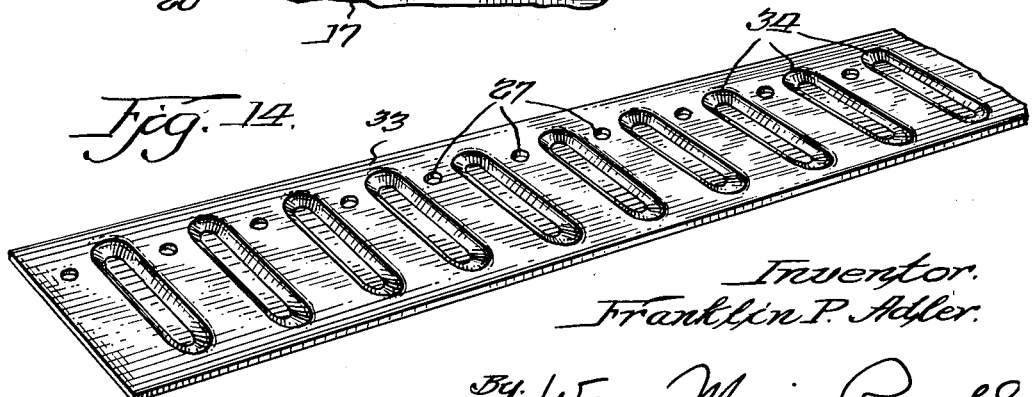
Inventor.
Franklin P. Adler.
By Wayne Morris Russell
Atty.

Feb. 28, 1956  F. P. ADLER  2,736,269
BOX CAR SIDE SILL CONSTRUCTION
Filed Sept. 14, 1950  6 Sheets-Sheet 6
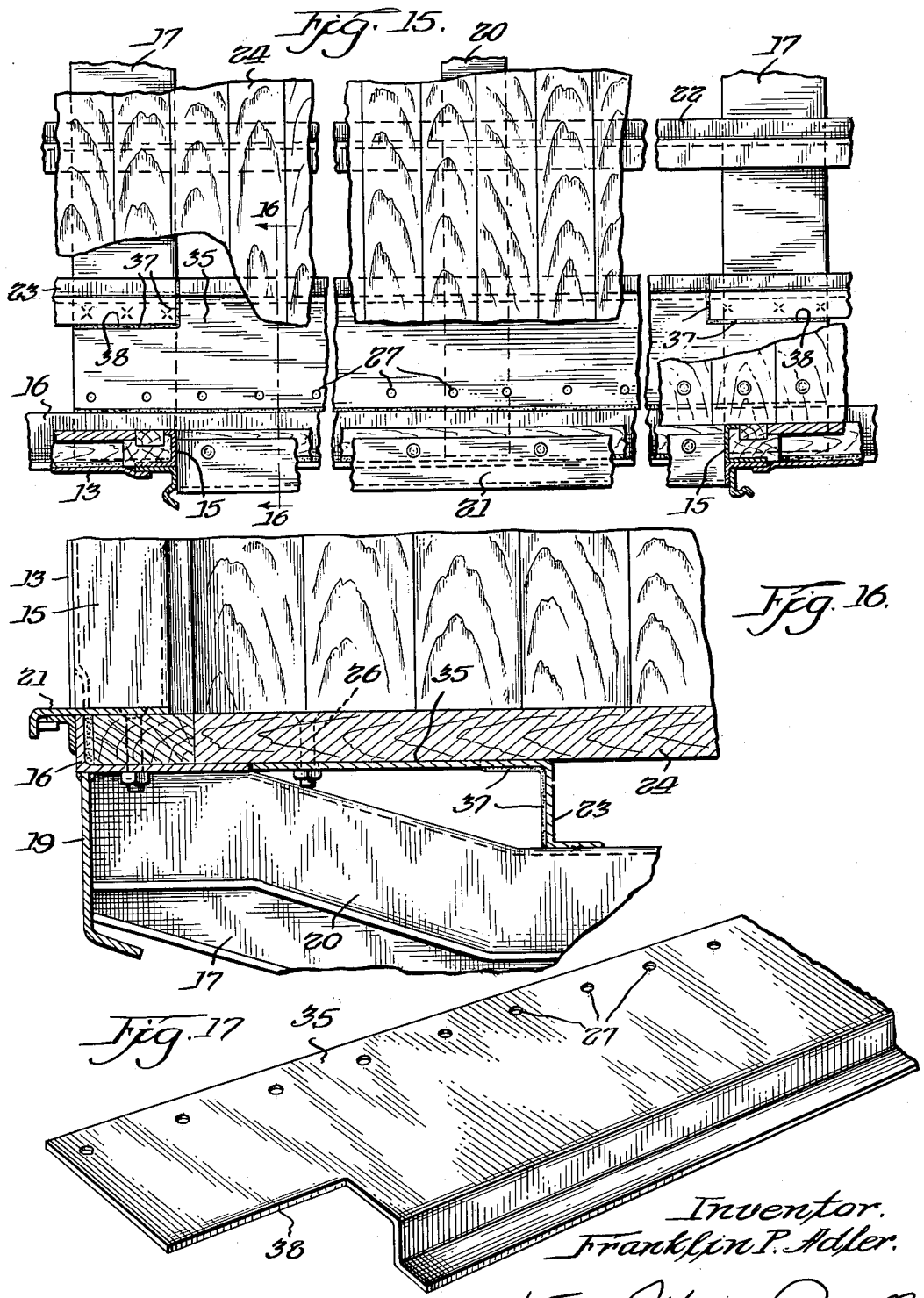
Inventor.
Franklin P. Adler.
By Wayne Morris Russell.
Atty.

United States Patent Office 2,736,269
Patented Feb. 28, 1956

2,736,269

BOX CAR SIDE SILL CONSTRUCTION

Franklin P. Adler, Michigan City, Ind., assignor to Pullman-Standard Car Manufacturing Company, Chicago, Ill., a corporation of Delaware Application September 14, 1950, Serial No. 184,763

11 Claims. (Cl. 105—414)

This invention relates to a floor and side sill construction for railway box cars and is primarily concerned with reinforcing such a floor in areas of concentrated loads and strengthening the side sill members of the car framing structure in areas of greatest stress.

The principal objects of the invention are to provide additional support for the car floors at the side doorways and to reinforce the side sill members of the car framing against vertical and horizontal deflection across the doorways.

The invention has for its specific object the provision of a reinforcing plate connection between the side sill and next adjacent longitudinal stringer of the underframe at each side of the car, extending between and connected to the crossbearers at opposite sides of the side doorways to provide at once a strong reinforcing brace for the side sill across the doorway and an additional support for the floor immediately inside the door adapted to carry some of the applied floor loads to the crossbearers.

The foregoing and other objects of the invention are attained by the construction and arrangement illustrated in the accompanying drawings wherein—

Fig. 1 is a general side elevational view of a railway box car in the area of the side door opening;

Fig. 2 is a general plan view of the car floor and underframe construction in the area between the doorways and having portions of the floor broken away to show one of the reinforcing plate connections of this invention;

Fig. 3 is a transverse sectional view through the car floor and underframe taken on the line 3—3 of Fig. 2 showing the application of the reinforcing plate connection at respectively opposite sides of the car between the side sill and next adjacent stringer;

Fig. 4 is an enlarged fragmentary cross sectional view through the side sill and adjacent stringer showing the reinforcing plate connection therebetween;

Fig. 5 is a detail perspective view of the reinforcing plate of the generally flat type shown in Figs. 3 and 4;

Fig. 6 is a fragmentary plan view of a car floor adjacent the doorway having parts broken away to show the use of a reinforcing plate of a different type, having a longitudinally extending corrugation;

Fig. 7 is a fragmentary cross sectional view taken on the line 7—7 of Fig. 6 through the side sill and adjacent stringer to larger scale, similar to Fig. 4 but showing the corrugated reinforcing plate connection with the corrugation supported upon the cross members of the underframe;

Fig. 8 is a detail perspective view of the corrugated reinforcing plate shown in Figs. 6 and 7;

Fig. 9 is a fragmentary plan view of a car floor adjacent the doorway, similar to Fig. 6, and having parts broken away to show the use of a reinforcing plate of another type having a longitudinally arranged corrugation of generally X-shape;

Fig. 10 is a fragmentary cross sectional view to larger scale through the side sill and adjacent stringer taken on the line 10—10 of Fig. 9;

Fig. 11 is a detail perspective view of a portion of the reinforcing plate with X-type corrugation shown in Figs. 9 and 10;

Fig. 12 is a fragmentary plan view of a car floor adjacent the doorway, having portions broken away to illustrate the use of another type of reinforcing plate having a plurality of longitudinally spaced corrugations disposed transversely of the plate;

Fig. 13 is a fragmentary cross sectional view to larger scale taken on the line 13—13 of Fig. 12 through the side sill and adjacent stringer, with the transversely corrugated reinforcing plate connected therebetween;

Fig. 14 is a detail perspective view of a portion of the transversely corrugated reinforcing plate illustrated in Figs. 12 and 13;

Fig. 15 is a fragmentary plan view of a car floor adjacent the doorway, with portions broken away to show the use of another form of reinforcing plate incorporating an integral stringer portion replacing the longitudinal stringer of the car underframe next adjacent the side sill through the area of the doorway and secured thereto at opposite sides of the doorway;

Fig. 16 is a fragmentary cross sectional view to larger scale taken on the line 16—16 of Fig. 15 through the side sill and reinforcing plate; and Fig. 17 is a detail perspective view of a portion of the reinforcing plate and integral stringer portion shown in Figs. 15 and 16.

In the art of railway box car construction it has been the practice heretofore to support the wooden floor on the center and side sills and intermediate longitudinal stringers, which ordinarily has been sufficient, but it has been found that modern methods of loading box cars are causing break-throughs in the floor structure to an increasingly greater extent. Mechanized loading devices such as fork trucks and platform trucks carrying pallet loads into cars of this type have greatly increased the abuse to which box car floors are subjected, and the heavily concentrated wheel loads of these loading vehicles cause considerable floor breakage, which has been found to occur in a large proportion of such instances in the area of the doorway. It has also been the experience of railroad operating departments to find that the side sills break in the doorway adjacent to the doorposts. The present invention provides a construction which affords additional support for the car floor in the doorways and reinforces the side sills across the door areas.

In the drawings, 10 represents a railway box car having a roof 11 supported on side plates 12 of the side walls 13 which include doorways 14 defined by door posts 15 extending between the side plates and side sills 16 of the underframe. Crossbearers 17, supported on the center sill 18, extend across the underframe at opposite sides of the doorways and are connected to the side sills and sub side sills 19 substantially adjacent the door posts 15 and are supplemented by intermediate cross ties 20 which extend between the center and side sills and the sub sills. The sub sills 19 supplement the side sills 16 in the door areas and beyond, and threshold plates 21 are removably secured to the side sills in the areas between the door posts. Longitudinal stringer members in the form of Z sections 22 and 23 are supported upon the various crossbearers and cross members of the underframe and extend substantially full length of the car. The crossbearers 17 are relatively deep and function in the structure to assist in distributing the weight of the car, and act as ties between the various longitudinal sills. Wooden floor 24, comprised of a plurality of transversely extending boards, is supported upon the side sills, stringers and center sill.

The various longitudinals of the underframe comprise the sole supporting structure for the floor boards throughout substantially the major area of the car, but immediately inside of each of the side door openings, additional support is provided for the floor to avoid breakthroughs in these areas. These comprise critical points in the floor structure in that the cars are loaded by means of trucks passing repeatedly through the doorways 14 and frequently entirely through one or more cars to one on an adjacent track, and to provide access to the cars from loading areas, loading plates are disposed in the doorways between a loading dock and the car to bridge the space therebetween and between cars on adjacent tracks, so that in actual service the wheels of lift trucks entering the cars drop off of the loading plate directly onto the wooden floor at a point between the side sill and next adjacent stringer, imposing shock loads which the bare wooden floor frequently is unable to support. In order to avoid breaking of the floor at these points from such heavily concentrated wheel loads, the present floor is reinforced on the underside between the side sills 16 and next adjacent stringers 23 in the area between the crossbearers 17.

As best shown in Fig. 4, the horizontal flange of the side sill 16 is disposed inwardly substantially at the upper level of the underframe, and the top flange of the Z-section stringer member 23 is disposed outwardly so that such flanges of the two members are disposed in opposed relation on a plane at the underside of the wooden floor 24. The opposed flanges, as shown in this figure, are connected by means of a flat plate 25 disposed in abutting relation between the edges of the flanges and integrally secured by welding. This plate directly supports the floor between the sill and stringer, apportioning applied floor loads between the two members and assisting in distributing such loads to the crossbearers 17 and crosstie 20, since the plate extends continuously between and overlaps the crossbearers, providing a reinforcement at least coextensive with the doorways. The plate 25, in addition to supporting the floor at these critical points, also serves to reinforce and strengthen the side sill 16. The side wall structure of a box car is weakest at the door opening due to the absence of any girder effect, and only the side plate and side sill carry the load across this area. The sub sill 19 is designed to reinforce the side sill, but excessive stressing of the side sill structure at the door opening continues to occur even with this additional bracing. The plate 25 joins the stringer 23 with the side sill entirely across the door opening, and the four members—sub sill 19, side sill 16, plate 25 and the stringer 23, combine to provide a generally channel-shaped integrated structure, strengthening the side sill in this area and acting somewhat in the nature of a beam across the doorway which is securely attached to the cross members of the underframe for distribution of stresses into the car framing structure.

The reinforcing plate joins the stringer 23 with the side sill to provide greater strength, and the arrangement effectively reinforces the side sill member and lends additional support to the car floor against crushing loads. An important feature of the reinforcing plate is realized in the additional resistance to lateral deflection of the side sill which it affords. It has been found in practice that under car impact the side sills deflect horizontally in the doorways, and this stressing of the members materially contributes to the possible failure of the sills in service. Such deflection is very effectively prevented by the reinforcing plates 25, since the full resistance thereof in shear disposed between the oppositely extending flanges of the side and adjacent stringers is opposed to any horizontal deflection. The wooden boards of the floor 24 are secured to the side sills 16 beyond the door openings by means of the usual floor clips (not shown) but in the area of the doorways, the boards are bolted directly to the reinforcing plate 25 by means of bolts 26 and the plate is perforated adjacent the side sill for this purpose, as at 27.

In the arrangement illustrated in Figs. 6, 7 and 8, the reinforcing plate 28 is provided with a lengthwise corrugation or rib 29 disposed downwardly intermediate the side sill 16 and stringer 23 and which acts in the nature of an additional stringer supporting the reinforcing member directly on the cross members of the underframe and carrying a substantial portion of applied floor loads to the crossbearers 17 at opposite sides of the doorways. The plate is offset downwardly at its edges, as at 30, in a manner to lap the horizontal opposed flanges of the sill and stringer to which it is secured by welding.

In the arrangement of the reinforcing plate 31, illustrated in Figs. 9, 10 and 11, the plate is reinforced in a generally diagonal direction by means of an X-shaped corrugation 32 extending lengthwise of the plate to provide additional stiffness for supporting and distributing floor loads. This plate is disposed in abutting relation edgewise between the opposed flanges of the side sill and stringer, and welded.

The reinforcing plate 33 of Figs. 12, 13 and 14 is provided with a plurality of parallel stiffening corrugations 34 extending crosswise of the plate for distributing floor loads between the sill and stringer members and acting as columns against lateral deflection of the side sill. The plate is welded edgewise between the horizontal flanges of the sill and stringer members.

Figs. 15, 16 and 17 illustrate an arrangement wherein the reinforcement replaces the stringer 23 in the area between the crossbearers 17. In this arrangement, the stringer Z-section 23 is cut out between the crossbearers, as best shown in Fig. 15, with the resulting stringer ends supported upon the respective crossbearers. A reinforcing plate structure 35 is disposed in the plane of the side sill horizontal flange and of the top flange of the stringer and is provided with an integral depending section at the inner side in substantial alignment with the stringer 23. The depending portion takes the form of a flanged web 36, with the vertical web portion thereof in alignment with the web portion of the stringer and the horizontal bottom flange in alignment with the bottom flange of the stringer so that the effect is to continue the Z-section of the stringer across the doorway between the crossbearers 17, and with the reinforcing plate structure welded to the stringer as at 37, the effect is to provide a continuous integrated stringer construction. The reinforcing plate 35 is continuous across the door opening 14 and over the crossbearers 17 and is disposed in the same surface plane with the top flange of the stringer 23 to support the floor 24, but is cut out at opposite ends on the inner side, as at 38, to provide for the support of the stringer ends on the crossbearers. The reinforcing plate structure is designed for disposition in end abutting relationship with the stringer sections and is welded thereto entirely around the cut-out portion 38, including the depending vertical web portion and horizontal bottom flange, and with the structure thus integrally secured and the top plate portion 35 on a level with the top flange of the stringer, the floor 24 is effectively supported throughout the width of the reinforcement to the inside edge of the stringer 23 entirely across the space between the crossbearers in the same manner as though a one-piece stringer were utilized.

From the foregoing, it will be seen that there has been provided a box car side sill reinforcement wherein the section of the sill has been enlarged to provide greatly increased resistance to vertical deflection and constructed to incorporate a horizontally deep section to prevent lateral deflection of the sill in the doorway, and which supports and reinforces the car floor inwardly of the side sill.

What is claimed is:

1. In a railway box car having a side wall including a door opening, a side sill, a stringer member paralleling said sill in horizontally spaced relation thereto, and a reinforcing member positioned longitudinally of the car opposite the door opening between said sill and stringer and extending slightly beyond the full width of the door opening and connected to said sill and said stringer.

2. In a railway box car having a side wall including a door opening, a side sill having an inwardly directed flange, a stringer member paralleling said sill in horizontally spaced relation and having an outwardly directed flange, and a reinforcing member positioned longitudinally of the car opposite the door opening between and on a horizontal level with said flanges and extending slightly beyond the full width of the door opening and connected to said flanges.

3. In a railway box car having a floor and a side wall including a door opening, an underframe including crossbearers at respectively opposite sides of said door opening, a side sill substantially coextensive with said side wall traversing said crossbearers, a stringer member paralleling said sill in spaced relation thereto and supported by said crossbearers, and a reinforcing member extending between and connecting the crossbearers, the side sill and the stringer member at the underside of said floor in the area adjacent said door opening.

4. In a railway box car having a floor and a side wall including a door opening, an underframe including crossbearers at respectively opposite sides of said door opening, a side sill substantially coextensive with said side wall traversing said crossbearers, a stringer member paralleling said sill in spaced relation thereto and supported by said crossbearers, and a plate reinforcing said sill and floor secured to the sill and said stringer and overlapping said crossbearers whereby floor stresses adjacent said door opening are distributed between the sill and stringer member to the crossbearers.

5. In a railway box car having a side wall including a door opening, an underframe including crossbearers at respectively opposite sides of said door opening, a side sill substantially coextensive with said side wall traversing said crossbearers, a stringer member paralleling said sill in spaced relation thereto and supported by said crossbearers, said sill having an inwardly extending flange substantially coincident with the top of said stringer, a depending sub sill secured to said side sill extending across the ends of said crossbearers, and a plate member secured to said inwardly extending flange and to the stringer member overlapping the crossbearers and combining with said stringer member, side sill and sub sill to provide an inverted substantially channel-shaped section extending across the crossbearers adjacent said door opening.

6. In a railway box car having a floor and a side wall, said wall including a door opening, an underframe including crossbearers at respectively opposite sides of said door opening, a side sill substantially coextensive with said side wall traversing said crossbearers, a stringer member paralleling said sill in spaced relation thereto and supported by said crossbearers, said sill having an inwardly extending flange and said stringer having an outwardly extending flange both supporting said floor, and a plate member secured to said flanges supporting said floor between said sill and stringer extending in overlapping relation to said crossbearers and combining with the sill and stringer to provide an integrated reinforcing beam section in the area of said door opening.

7. In a railway box car having a floor and a side wall, said wall including a door opening, an underframe including crossbearers at respectively opposite sides of said door opening, a side sill substantially coextensive with said sill wall traversing said crossbearers, a stringer member paralleling said sill in spaced relation thereto and supported by said crossbearers, said sill having an inwardly extending flange and said stringer having an outwardly extending flange both supporting said floor, and a plate member secured to said flanges supporting said floor between said sill and stringer extending in overlapping relation to said crossbearers and combining with the sill and stringer to provide an integrated reinforcing beam section in the area of said door opening, said plate member having a depending lengthwise rib engaging said crossbearers intermediate the side sill and stringer to distribute applied floor loads to the crossbearers.

8. In a railway box car having a floor and a side wall, said wall including a door opening, an underframe including crossbearers at respectively opposite sides of said door opening, a side sill substantially coextensive with said side wall traversing said crossbearers, a stringer member paralleling said sill in spaced relation thereto and supported by said crossbearers, said sill having an inwardly extending flange and said stringer having an outwardly extending flange both supporting said floor, and a plate member secured to said flanges supporting said floor between said sill and stringer extending in overlapping relation to said crossbearers and combining with the sill and stringer to provide an integrated reinforcing beam section in the area of said door opening, said plate member having a generally X-shaped depending corrugation reinforcing the plate to distribute applied floor loads between the side sill and said stringer and to the crossbearers.

9. In a railway box car having a floor and a side wall, said wall including a door opening, an underframe including crossbearers at respectively opposite sides of said door opening, a side sill substantially coextensive with said side wall traversing said crossbearers, a stringer member paralleling said sill in spaced relation thereto and supported by said crossbearers, said sill having an inwardly extending flange and said stringer having an outwardly extending flange both supporting said floor, and a plate member secured to said flange supporting said floor between said sill and stringer extending in overlapping relation to said crossbearers and combining with the sill and stringer to provide an integrated reinforcing beam section in the area of said door opening, said plate member having a plurality of generally transversely extending corrugations reinforcing the plate for distribution of applied floor loads between the side sill and said stringer.

10. In a railway box car having a floor and a side wall including a door opening, an underframe including cross members at respectively opposite side of said door opening, a side sill substantially coextensive with said side wall traversing said cross members a stringer member paralleling said sill in space relation thereto and supported by said cross members, and a horizontally deep web secured to and extending between said sill and said stringer, said web extending in limiting overlapping relation to said cross members, thereby reinforcing the sill and floor adjacent said door opening.

11. In a railway box car having a floor and a side wall including a door opening, an underframe including crossbearers at respectively opposite sides of said door opening, a side sill substantially coextensive with said side wall traversing said crossbearers, a stringer member paralleling said sill in spaced relation thereto and supported by said crossbearers, and a horizontally deep web secured to said side sill and said stringer and extending in overlapping relation to said crossbearers reinforcing the sill and floor adjacent said door opening, said stringer member being discontinuous in the area of the door opening and said web having a depending flange structure in substantial alignment with said stringer.

References Cited in the file of this patent

UNITED STATES PATENTS

| | | |
|---|---|---|
| 421,653 | Barnes | Feb. 18, 1890 |
| 2,035,113 | Blomberg | Mar. 24, 1936 |
| 2,243,113 | Mussey et al. | May 27, 1941 |